Aug. 7, 1923.

M. OLSON 1,464,331

WIRE CHAIN MACHINE

Filed March 21, 1922   11 Sheets-Sheet 1

INVENTOR.
Mauritz Olson
BY
ATTORNEYS.
Chamberlain & Newman

Aug. 7, 1923.

M. OLSON

WIRE CHAIN MACHINE

Filed March 21, 1922 11 Sheets-Sheet 5

1,464,331

INVENTOR.
Mauritz Olson
BY
ATTORNEYS.
Chamberlain & Newman

Aug. 7, 1923.

M. OLSON 1,464,331

WIRE CHAIN MACHINE

Filed March 21, 1922   11 Sheets-Sheet 6

INVENTOR.

BY Mauritz Olson

ATTORNEYS.

Chamberlain + Newman

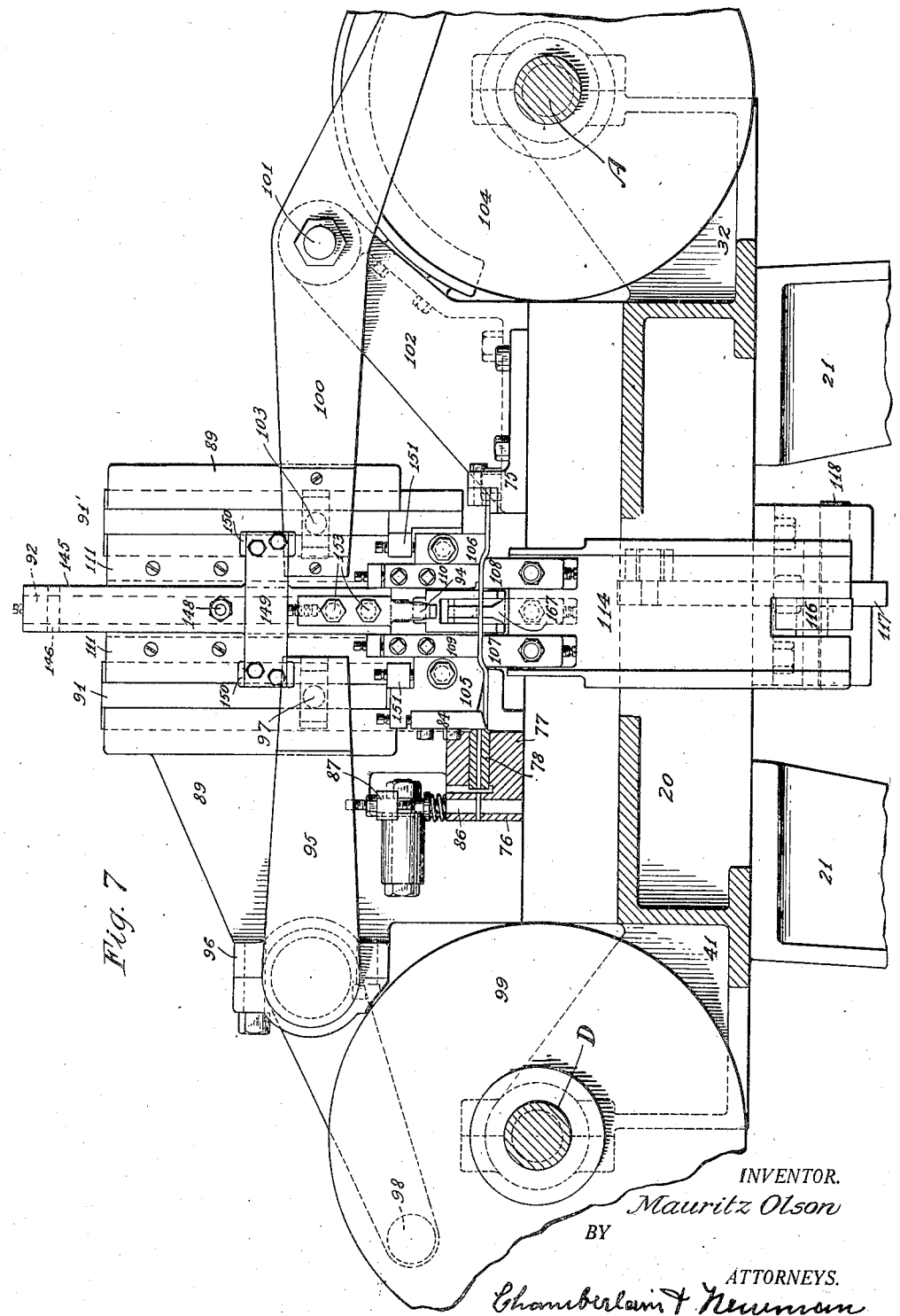

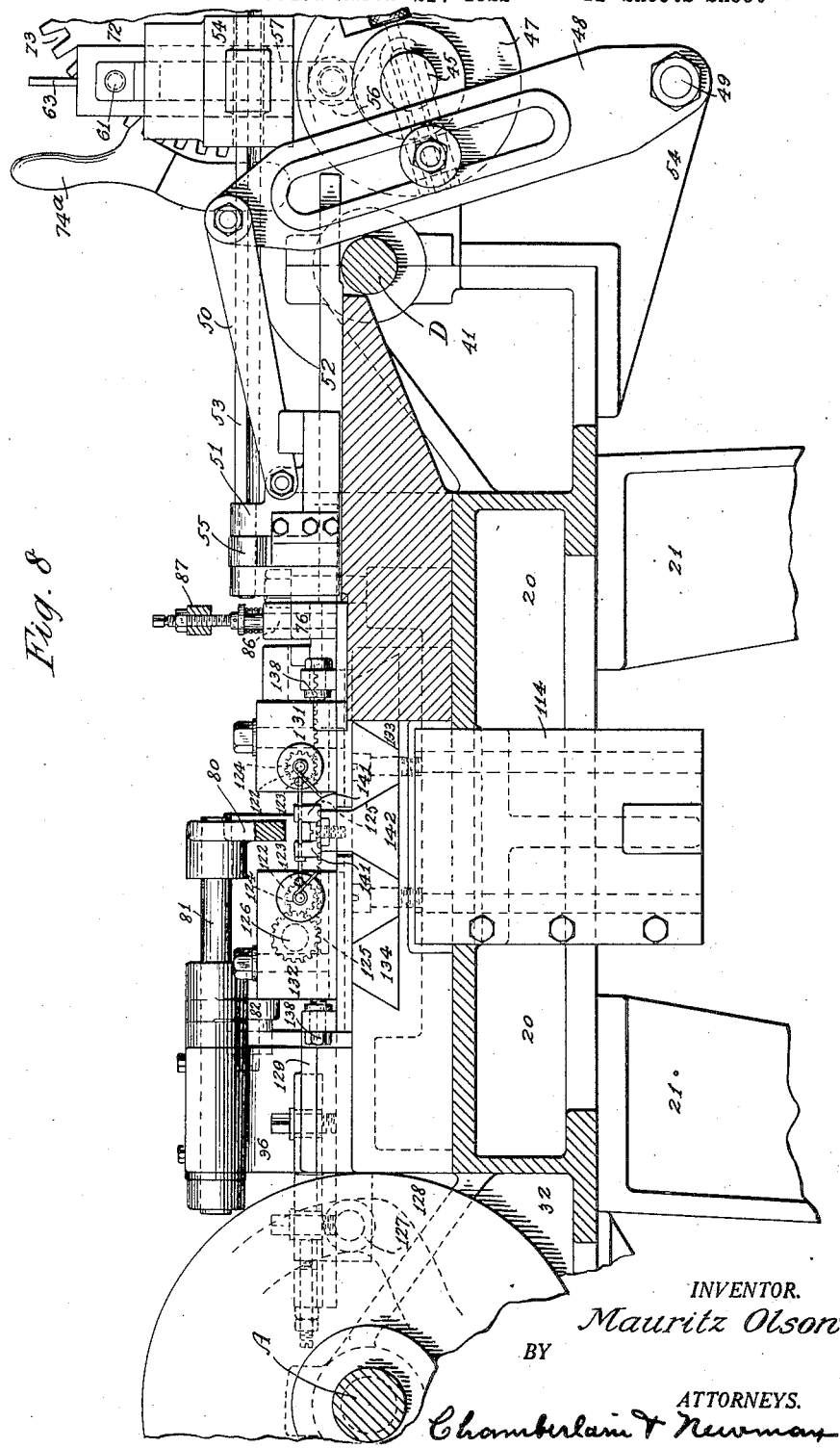

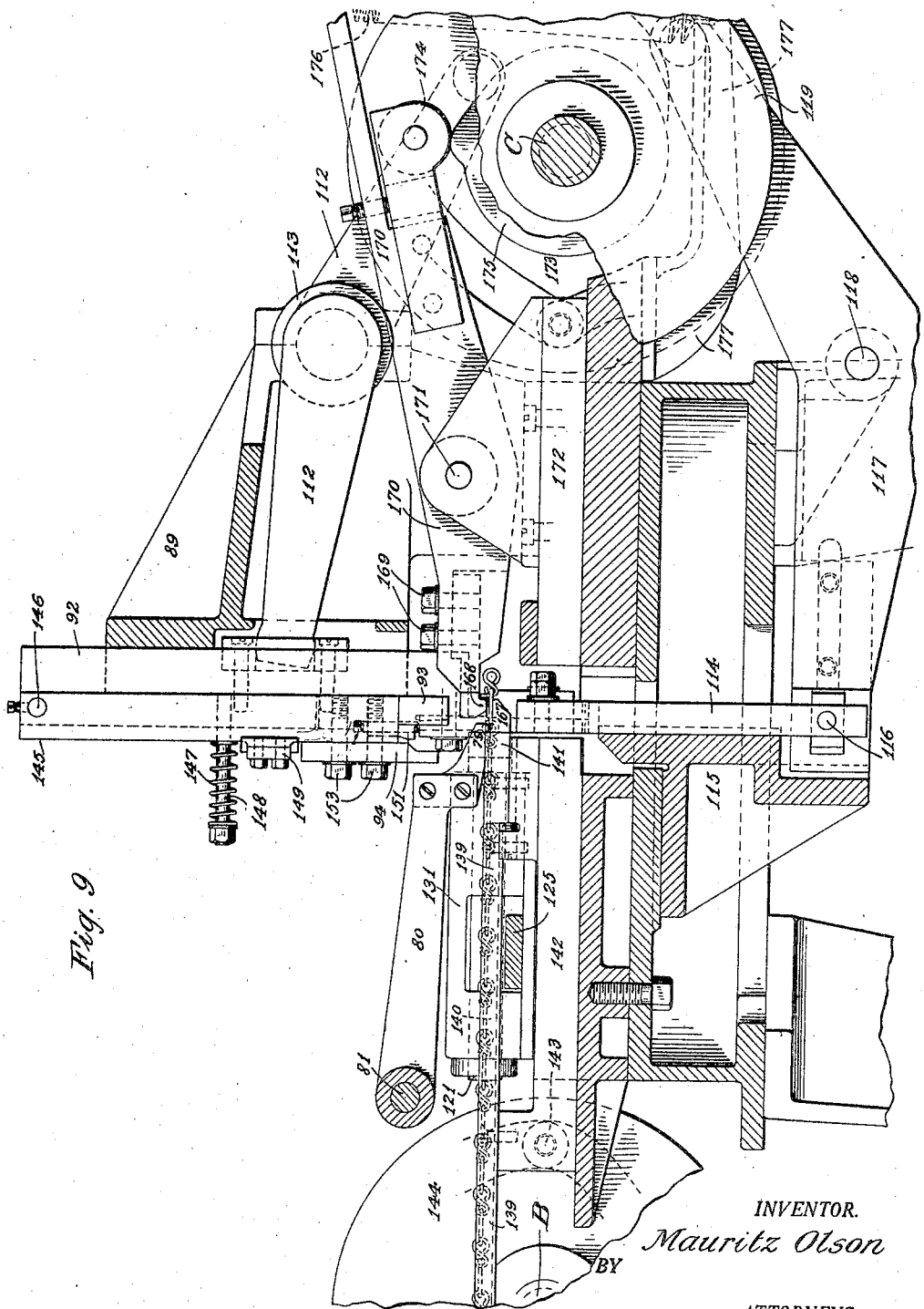

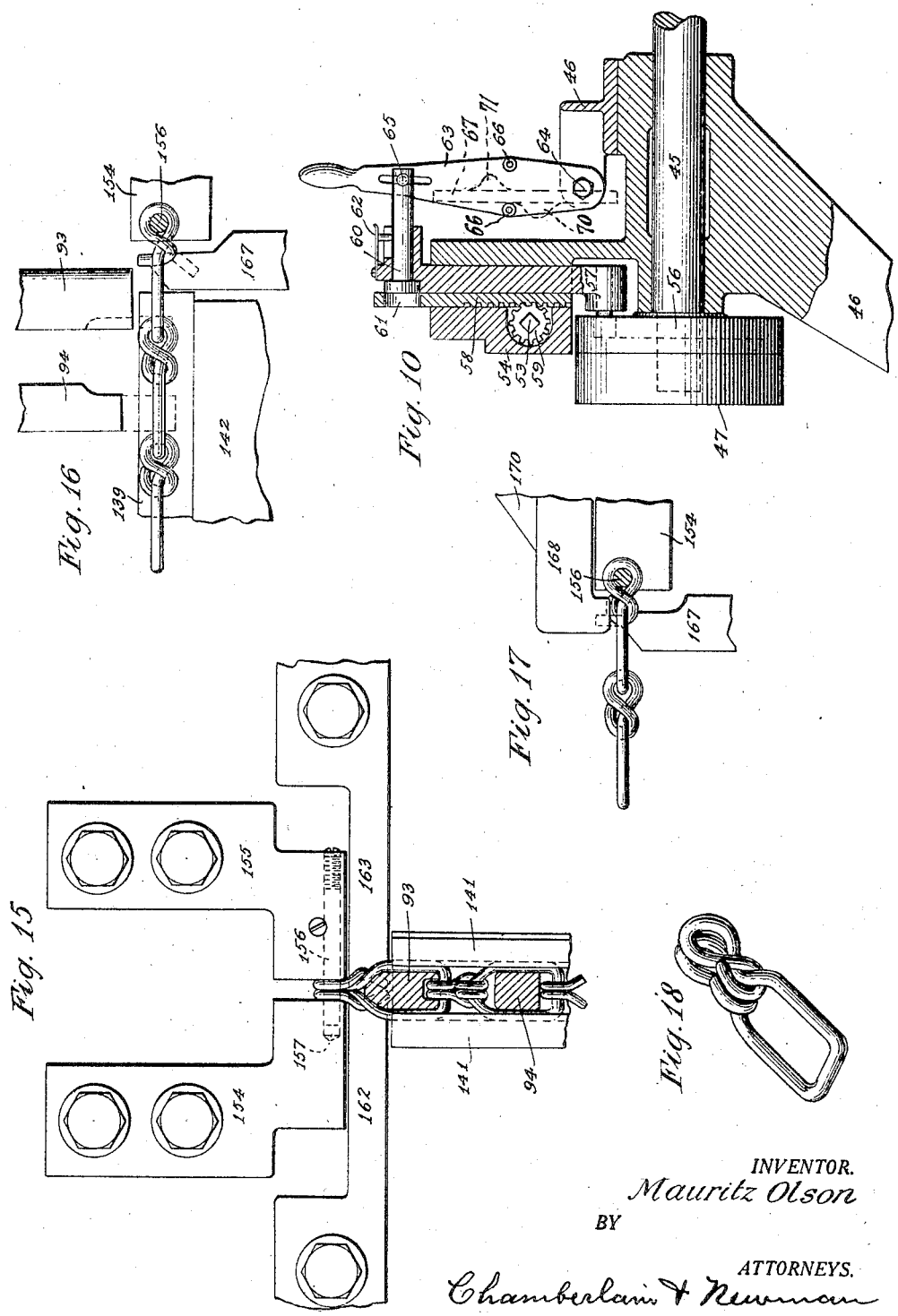

Aug. 7, 1923.
M. OLSON
1,464,331
WIRE CHAIN MACHINE
Filed March 21, 1922   11 Sheets-Sheet 11
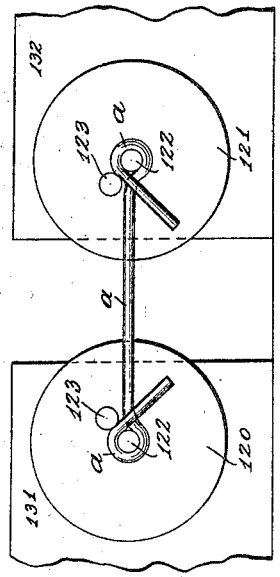
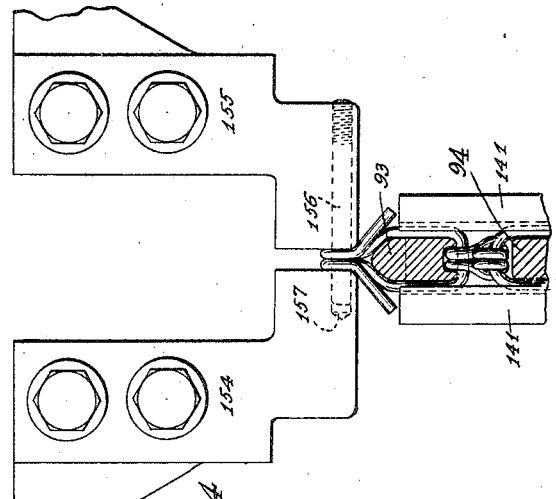
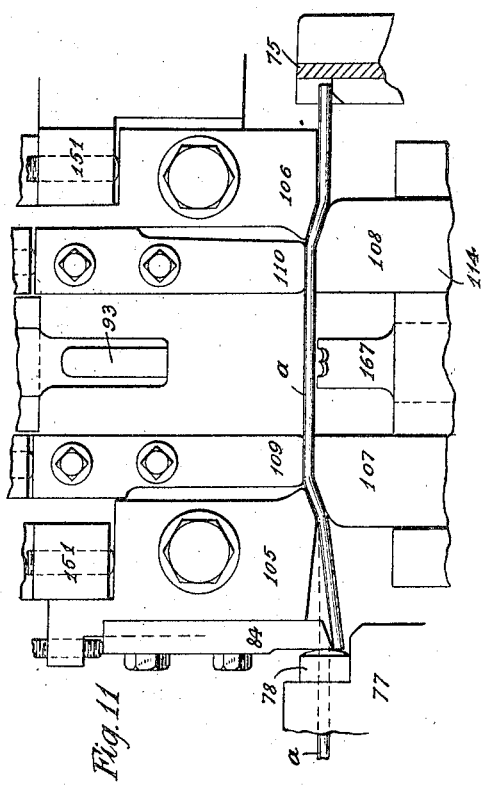
INVENTOR.
Mauritz Olson
BY
ATTORNEYS.
Chamberlain & Newman Patented Aug. 7, 1923.

1,464,331

UNITED STATES PATENT OFFICE.

MAURITZ OLSON, OF BRIDGEPORT, CONNECTICUT, ASSIGNOR TO THE A. H. NILSON MACHINE CO., OF BRIDGEPORT, CONNECTICUT, A CORPORATION OF CONNECTICUT.

WIRE CHAIN MACHINE.

Application filed March 21, 1922. Serial No. 545,588.

*To all whom it may concern:*

Be it known that MAURITZ OLSON, a citizen of the United States, and resident of Bridgeport, in the county of Fairfield and State of Connecticut, has invented certain new and useful Improvements in Wire-Chain Machines, of which the following is a specification.

My invention relates to chain machines of that class whereby wire chain links are automatically assembled and formed, to produce a continuous piece of chain, or predetermined lengths of the same.

The machine is especially designed and adapted for making substantially that form of chain link known in the trade as "a lock link chain", but which more closely resembles the link shown in Figs. 15 and 18 of the drawings of this application.

The design of link illustrated herein is one wherein the two end portions of the wire are completely turned over the shoulders of the link and disposed in substantially the same direction, against the eye portion of the link. To the best of my knowledge, however, a single chain machine has not heretofore been built capable of producing a link; one having its wire ends closely tucked in, out of the way, and against the eye portions of the link so as to form a smooth running chain.

The objects of my invention therefore are to generally improve upon the construction of wire chain machines of this type, whereby a stronger and smoother chain is produced and to provide a different order of operations upon the blank so the production, per hour, of a single machine may be materially increased. Further and especially the object of my invention is to include means whereby the two adjacent upwardly disposed end portions of the wire of the link are simultaneously bent forward and together closely pressed in over the shoulders of the link and their ends disposed against the peripheries of the eye portions of the link, thereby forming a stronger tie of the eye to the shoulders and a smoother link which allows a freer running of the chain through the hands, when occasion requires, and which construction also better adapts it for use on sprocket wheels for driving purposes.

Further objects of the invention reside in improved mechanism of the machine whereby given lengths of chain including any desired number of links may be formed in rapid succession without stopping the machine or wasting wire, and to include means that may be readily changed to form pieces of chain of different lengths. Another object of the invention is to provide a setting tool which performs a final operation of setting the link after it is assembled and formed, whereby the two eye portions are tightly closed together, forming a rigid link which will not permit the chain formed thereof to stretch.

The preliminary operations upon the wire blank in the forming of a link in my machine require several pairs of tools, each pair of which operates simultaneously upon the end portions of the wire blank for the preliminary operations in the forming of the two eyes. The two end portions of the blank are bent in, in substantially the same manner with relation to each other leaving the ends of the wire similarly disposed at the completion of each operation thereon. The U-ing of the link is formed by a single U-ing tool that operates against a central former post, after which the eye portions are again operated upon by pairs of side tools that shove the two eyes together in alignment and further dispose the end portions together and in under the central shouldered portion of the link. A single lower tool is employed for simultaneously engaging the two adjacent end portions of the wire and throwing them up against the inside of the loop, and around the shoulders, and a slidable hook-like tool is utilized for the final operation of tucking in the ends to form a finished link.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figs. of the accompanying drawings forming a part of this specification, and upon which, Fig. 1 shows a plan view of my improved chain machine, with a piece of wire being fed therein;

Fig. 7 shows a central vertical cross section on an enlarged scale, taken through the machine, on the line of travel of the wire as fed into the machine, see line 7—7 of Fig. 1;

Fig. 8 is a further cross section on an enlarged scale, taken on approximately the same line, but looking in the opposite direction, showing the wire curlers, forming tools and wire feeding mechanism;

Fig. 9 is a central vertical cross section taken at a right angle to Fig. 7 through some of the forming tools and along the line of travel of the completed chain as it comes from the machine;

Fig. 10 shows a vertical sectional elevation through the feed cut-out mechanism;

Fig. 11 shows an enlarged plan view of the first set of tools for cutting and preparing the wire link blank, also shown therein;

Fig. 12 shows an end view of the two curlers for performing the second of the bending operations as illustrated by the curled wire blank contained therein;

Fig. 13 is a plan view showing the tools for performing the next or "U-ing operation" and the U-shaped wire blank as shaped by said tools;

Fig. 14 shows a plan view of the loop closing tools, whereby the link is closed and the two eye portions brought together as represented by the wire blank contained in the tools;

Fig. 15 shows in addition to the closing tools seen in Fig. 1, the two wire-end bending slides for turning the two ends over the shoulders of the link as indicated by the link blank as shown;

Fig. 16 shows a lower tool for further bending-in the two wire ends around the shoulders of the link and deflecting said ends at substantially a right-angle to the loop portion, as indicated by the blank;

Fig. 17 illustrates the tools for the final operation, and a side view of the link as completed by said tools, said final operation being to more completely turn-in the extreme ends of the wire to dispose them out of the way to form a smooth running link; and Fig. 18 shows a perspective view of a completed link as formed in my improved machine.

Figure 1:
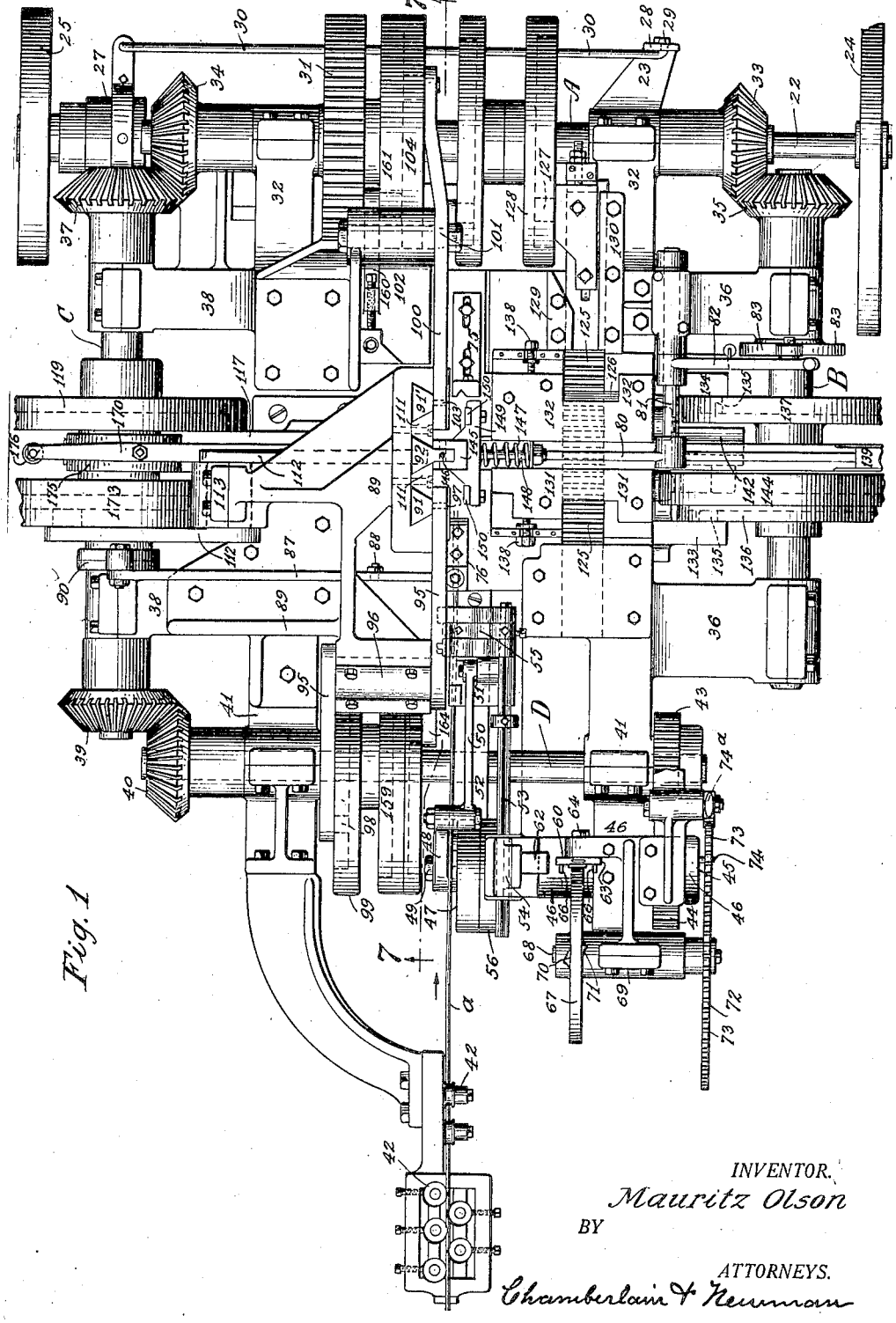
Figure 2:
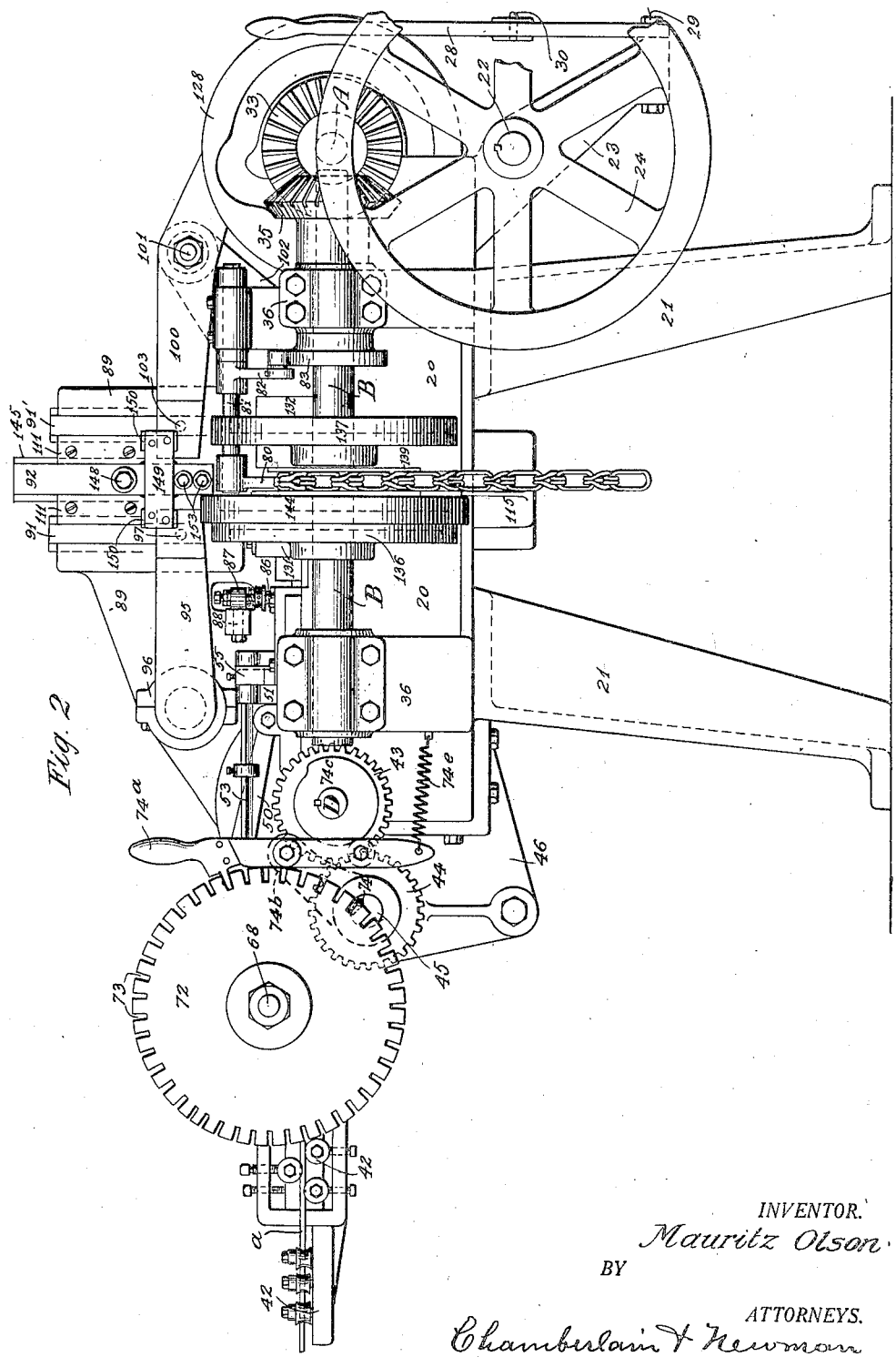
Fig. 2 is a front elevation of the machine as seen from the near side of Fig. 1.
Figure 3:
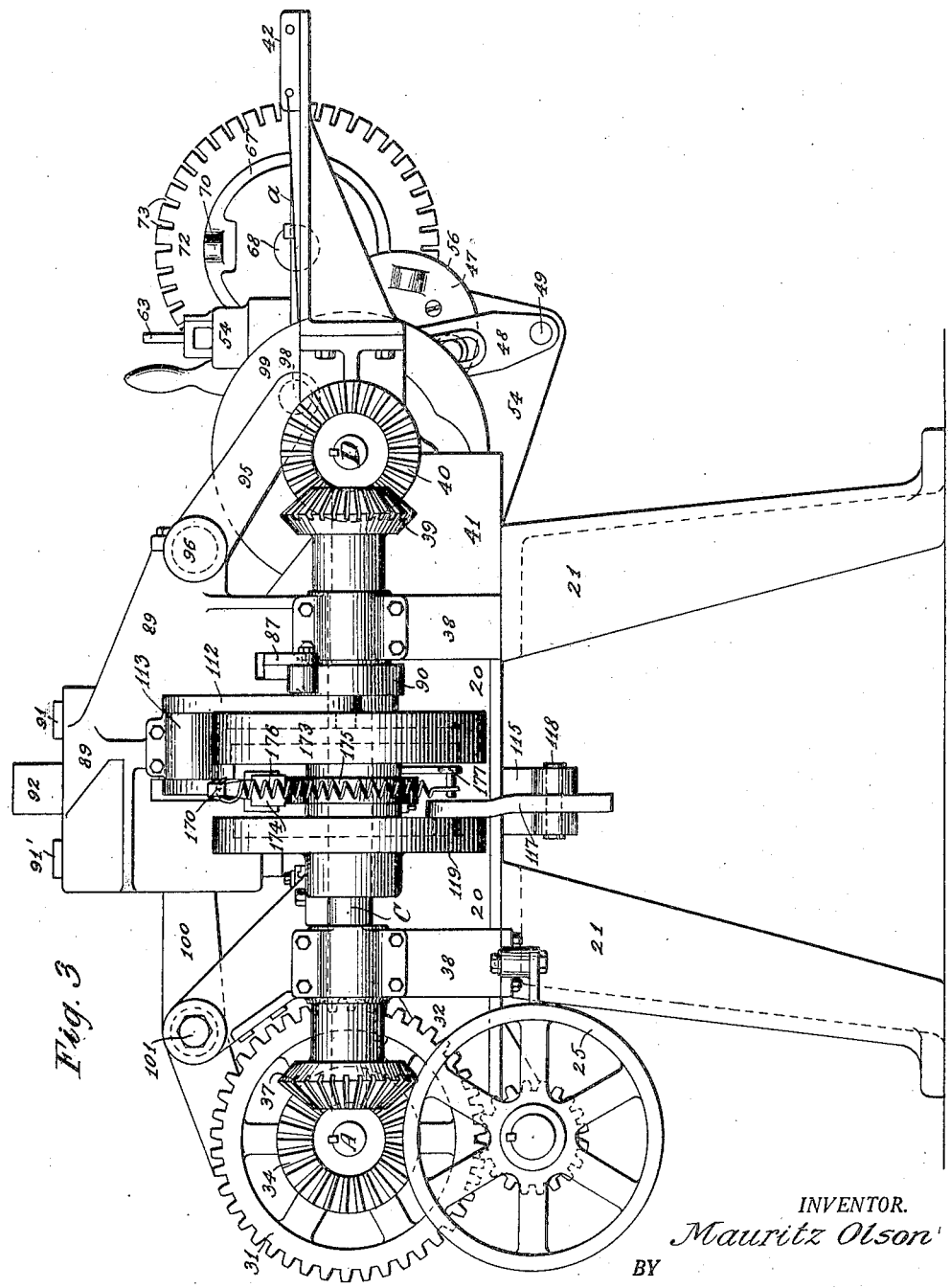
Fig. 3 is a rear elevation as seen from the opposite side from Fig. 2.
Figure 4:
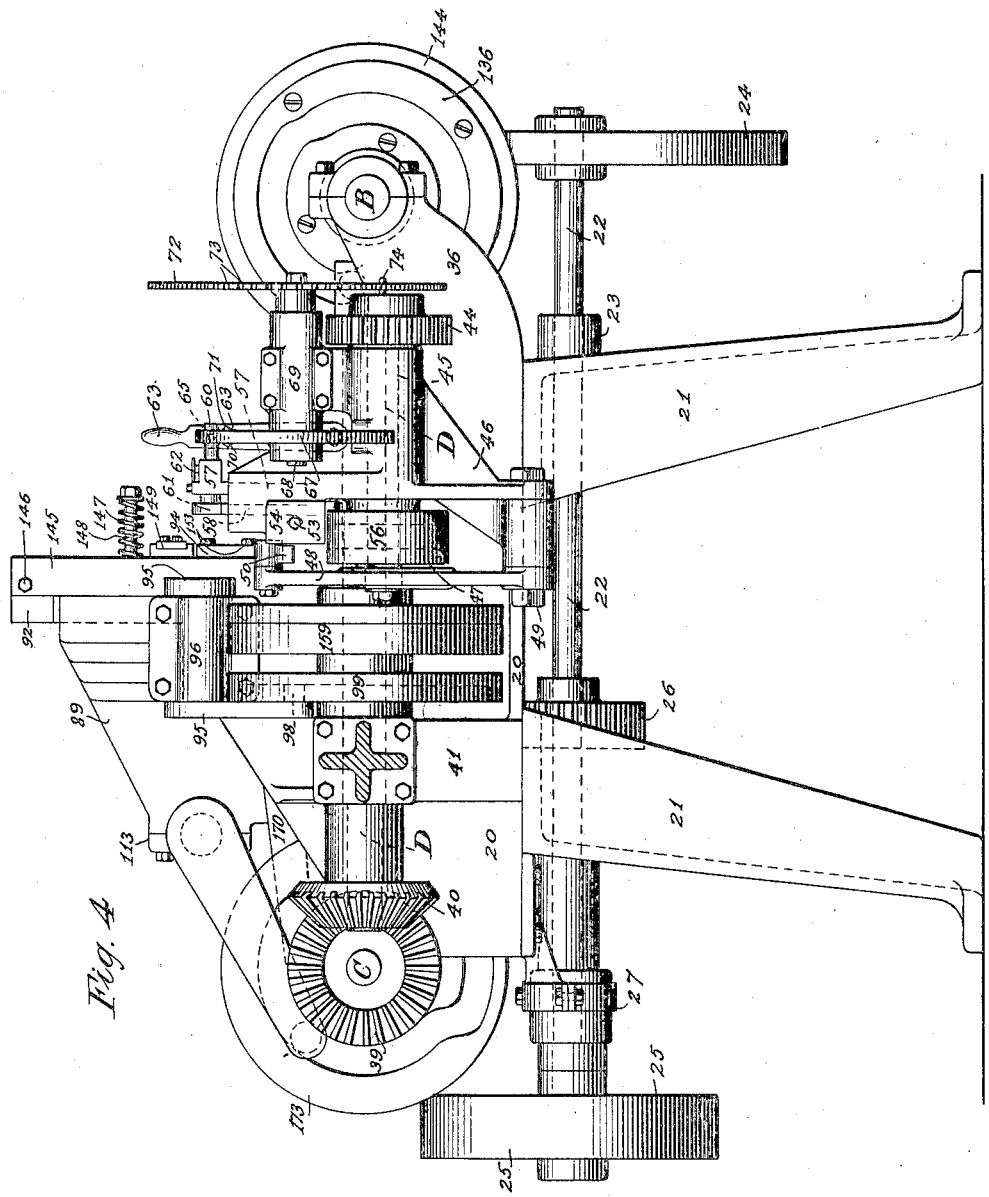
Fig. 4 is a side elevation as seen from the left of Fig. 1, which represents the side of the machine in which the wire is fed in, the bracket carrying the wire straightening rolls being omitted.

Referring in detail to the characters of reference marked upon the drawings, 20 represents the bed of the machine upon which all of the operative parts are carried, and which in turn is supported in the usual manner by legs 21. 22 represents a driving shaft that is journaled in bracket bearings 23 secured to the underside of the bed. This shaft carries a fly wheel 24 upon one end, and a belt wheel 25 upon the other and a pinion 26 upon its intermediate portion. 27 represents a clutch positioned upon the shaft and constructed to form a releasable driving connection as between the belt wheel and the shaft. The clutch is manually operated through a hand lever 28 pivoted at 29 to the end of the bracket bearing 23 and connected by link 30.

The gear 26 upon the driving shaft meshes with and drives a larger gear 31 upon a cam shaft designated as A and journaled in bearings 32—32 secured to the bed of the machine. This cam shaft is provided with a bevel gear 33 upon one end and a similar bevel gear 34 upon the other end. The first mentioned bevel gear 33 meshes with and drives another bevel gear 35 mounted upon the front cam shaft B, which is journaled in bearings 36—36 secured to the front of the bed of the machine. The bevel gear 34 carried upon the shaft A meshes with and drives a like bevel gear 37 mounted upon the third cam shaft C which is journaled in bearings 38 secured to the back of the bed of the machine. The opposite end of the cam shaft C is provided with a bevel gear 39 that meshes with and drives a co-acting bevel gear 40 mounted upon the cam shaft D and journaled in bearings 41 of the bed.

It will thus be seen that the machine includes four main cam-shafts and that each of said shafts carries a series of cams for operating tool carrying slides which work singly or in pairs, to cut and shape the wire to form the completed links. The slides referred to, for the most part, operate toward and from the center of the machine, where the link is formed, and are so shaped, arranged and timed with reference to each other as to perform their respective operations and to move back out of the way as soon as their particular operations are completed, to make room for other forming tools which follow for succeeding operations.

The wire designated as $a$ is taken from a reel, not shown, as is customary with wire forming machines, and is drawn forward through the wire straightening devices 42—42 by the wire feeding mechanism which I will next describe.

This feeding mechanism as before stated is of novel construction and serves to permit the wire gripping slide to be manually cut out at any time to stop the feeding operations and to be set so as to automatically successively perform a given number of feeding operations, then drop a stroke and immediately start feeding again, in a manner to produce if desired, pieces of chain having a specified number of links and of given lengths, such for instance as would be required in making certain forms of non-skid automobile tire chains. This cut-out mechanism as incorporated in my machine, is adapted to be readily adjusted for producing pieces of chain as before suggested of various lengths or set to allow the complete machine to operate uninterruptedly for the production of continuous lengths of chain.

The shaft D carries a gear 43 that meshes with and drives a similar gear 44 mounted upon a shaft 45 journaled in bracket 46 secured to the bed of the machine. Upon the opposite end of this shaft is secured an eccentric disk 47 that is connected with a rocker arm 48 whose lower end is pivoted at 49 to a bracket attached to the bed of the machine. A link 50 connects the upper end of said rocker arm with a slide 51 that is mounted to reciprocate upon the way 52 through the eccentric, arm and link connections referred to. A rocker shaft 53 having one end portion journaled in the slide and the other end portion mounted in an upwardly disposed part 54 of the bracket 46, serves to open and close the wire clamping jaw 55. The rocker shaft is held against endwise movement in the slide while its other end is free to be reciprocated backward and forward through the post, with the action of the said eccentric and its connections. This rocker shaft is further provided with a rocker movement by mechanism later to be described, whereby the jaw 55 is closed upon the wire at the outer end of the stroke of the slide and opened at the inner end of the stroke to release the wire when fed forward its predetermined distance.

The means for imparting this rocking movement to the rocker shaft is best shown in Figs. 1, 4, 8 and 10 and comprises a groove cam 56 that is mounted upon the before mentioned shaft 45 that serves to reciprocate a slide 57 bearing a roll that engages the said cam. This slide is vertically mounted in the before mentioned post 54 and is detachably connected with a rack 58 that engages a small gear 59 mounted upon the before mentioned rocker shaft 53, within the post, said gear having a square hole to fit upon the square shaft which is mounted to reciprocate therethrough but to be turned by the gear.

The detachable connection between the slide 57 and the rack 58 consists (see Fig. 10) in a latch 60 slidably mounted in the upper end of the slide, one end portion being adapted to normally engage the hole 61 in the rack to lock the slide and rack together so as to operate as one. A spring detent 62 mounted upon the upper end of the slide serves to frictionally engage a pin carried by the stem of the latch to hold it in or out of engagement with the rack. This rack is designed to be operated both manually and automatically so as to stop the feeding operations at any moment or to set the machine so that one feeding stroke will be skipped every so often. This cut-out therefore further comprises an operating lever 63, the lower end of which is pivoted at 64 to the bracket 46 and the upper portion is operatively connected as at 65 to the before mentioned latch. The lever is further provided with a pair of rolls 66—66 that straddle the edge portion of a rotary disk 67 mounted upon a short shaft 68 journaled in a bearing 69 of the before mentioned bracket. The disk carries two lugs 70 and 71 on opposite sides of its peripheral edge portion, one of which is positioned slightly ahead of the other so as to first engage one of the rolls 66 in a way to throw the latch out and the other lug positioned to engage the other roll of the lever and throw the latch in again with the next rotation of the shaft 45. These operations of the latch are performed with each complete rotation of the disk 67 and its shaft. A dial 72 is mounted upon the other end of this short shaft 68 and is provided with a series of notches 73 in its periphery to be engaged by the pin 74 projected from the end of the cam shaft 45, which serves to turn the dial and its shaft a fraction of a turn, with each complete rotation of the said shaft 45. With each complete rotation of this dial, which as shown includes 44 notches, the same number of feeding operations will be performed and an equal number of chain links will be made, before a skip in the feed occurs. If longer or shorter lengths of chain are required other dials will have to be substituted, having a greater or less number of notches.

The disk is normally held against rotation by the engagement of a tooth of a rocker arm 74ª that engages a notch of the disk. This arm is pivoted to a bracket at 74ᵇ and is automatically operated to engage and disengage its tooth with the respective notches of the disk by a cam 74ᶜ that engages a roll on the arm to throw the tooth out and by a spring 74ᵉ that serves to again throw the tooth in the said notch.

The wire feeding slide 52 obviously serves to feed the wire forward predetermined distances against the adjustable stop 75 secured to the bed of the machine, whereupon it is cut into proper lengths from which to form complete chain links without the necessity of trimming off the ends of the wire after the links have been formed. The wire is guided during its forward feeding movements, through suitable holes in the fixed guide blocks 76, 77 and 78. In addition to these wire guides I also provide a movable guide 79 that is carried on an inwardly disposed arm 80 mounted upon a rocker shaft 81 that is operated through a second arm 82, by a cam 83 upon the shaft B. This guide is thus mounted in order to be moved into and out of the path of movement of the wire so that the same will be guided into the eye of the previously formed link during its forward movement, and so that the guide will be raised out of the way while the link is being formed. The cutting-off tool 84 secured to the vertical reciprocatory tool 105 is positioned adjacent to the hole in the last named block or bushing 78.

A wire clamping device which serves to clamp and hold the wire during the return movement of the feed slide, and the cutting-off operation, is mounted in the before mentioned block 76, and comprises a plunger 86 that is mounted in a hole of the block and adapted to move vertically to engage and disengage the wire $a$ as it passes beneath the lower end. This plunger is operatably connected to one end of a lever 87 pivoted at 88 to a slide-bracket 89 and whose other end carries a roll that is engaged by a cam 90 mounted upon the before mentioned shaft C, that serves to operate the lever in a way to grip the wire at predetermined intervals, during the cutting operations as before stated.

The slide bracket 89 mounted upon the bed more particularly serves to support the three vertical reciprocatory slides 91, 91' and 92. The slide 92 is positioned in the bracket centrally of the machine and directly above the station where the wire link blank is formed, and serves to carry the two forming tools 93 and 94 which operate in connection with the U-ing tool in the forming of the loop of the link as will be later more fully described. The slides 91 and 91' are positioned at equal distances from and on the two sides of the center slide 92. These two slides are similar in construction and function but are operated by separate though similar devices. A lever 95 which is pivoted in a bearing 96 of the slide bracket 89 has one end portion operatively connected as at 97 to the slide 91 and carries a roll 98 upon its other end, that runs in a groove of a cam 99 mounted upon the before mentioned shaft D. The second lever 100 which is pivoted at 101 to a bracket 102 attached to the bed, has its inner end also similarly connected as at 103 to the slide 91' and its outer end in operative engagement with a grooved cam 104 so that the said lever 100 will be operated in unison with the aforesaid lever 95, so that the two slides 91 and 91' will be reciprocated simultaneously, and their respective forming tools 105 and 106 in connection with the lower tools 107 and 108 will perform the two preliminary bending operations in the end portions of the wire blank.

The wire blank, as shown in Figs. 7 and 11, is clamped just before the bending operations referred to so that the same will be tightly held while bending tools 105 and 106 are at work. This clamping device includes a pair of fixed tools 109 and 110 mounted on the lower end portions of the gibs 111 secured to the front of the slide bracket 89, and the pair of movable tools 107 and 108 carried by a lower and vertically operatable slide 114 (see Figs. 7 and 9). This slide is operatively mounted in a bracket 115 secured to the under side of the bed which serves to support and is pivotally connected as at 116 with one end of the lever 117 pivoted at 118 to the said bracket, and has its outer end portion in operative engagement with the groove of a cam 119. The shape of the groove of this cam is such as to impart two operative movements to the lever and slide with each complete rotation of said cam 119 and its shaft C.

After the completion of the preliminary bending operation as before referred to and as more clearly illustrated in Fig. 11, the two eyes $a$—$a$ are formed, by means of the wire curling devices which I will next describe, see Figs. 1, 6, 7, 9 and 12. There are two of these curling devices, one for bending each of the two end portions of the wire to form the eyes and to dispose the ends inward, downward and at an angle to the intermediate body portion of the wire. These curling devices each comprise a rotary shaft, one of which is designated as 120 and the other as 121. Each shaft is provided with an enlarged head portion upon its inner end, that carries a center pin 122 and an eccentrically positioned pin 123, that engages and bends the end portions of the wire blank against the forming post. The shafts are both provided with a peripherally toothed surface forming a pinion 124, one of which is directly engaged by the slidable cross-rack 125, and the other by an idler gear 126 that meshes with the said rack and is thus positioned intermediate of it and the curler shaft 121. The slide-rack 125 extends out over the right end of the machine and carries a roll 127 which is engaged by the groove of a cam 128 mounted upon the shaft A and whereby the said slide-rack is given a backward and forward sliding movement in its ways 129 and 130 secured to the bed. The curler shafts 120 and 121 are mounted in separate slidable members 131 and 132, one having a guide member 133 fixed to its under side and the other a similar guide 134. These guides are each fitted in suitable ways of the bed of the machine and are provided with rolls 135 that engage grooved cams 136 and 137 respectively, mounted upon the before mentioned shaft B, which serves to reciprocate said slides toward and from the wire blank.

The top portions of the slide 131 and 132 in which the curlers are rotatably mounted are made adjustable toward and from each other by means of adjusting screws 138. These curlers are thus provided through the slide-rack 125 with forward and backward rotary movement whereby the eccentric pins 123 carried in the curlers engage and curl the end portion of the wire blank up over and inward around the central pin 122 from the position shown in Fig. 11 to that shown in Fig. 12, and in addition each is provided with a forward and backward longitudinal movement effected through the before mentioned cams 136 and 137 whereby said curlers are simultaneously brought forward at proper times to engage the wire for said rotary curling operations and whereby they are likewise brought back to disconnect the pins from the wire after the curling operations have been completed as indicated in Fig. 12.

A chain conveyer 139 is slidably mounted in the bed of the machine, intermediate the two slide members 133 and 134 to receive and direct the finished chain from the machine. This conveyer includes a central longitudinal pocket, the opposite side walls of which are provided with grooves 140 in which the two longitudinal side members of the chain links are slidably supported. This conveyer is utilized for supporting the chain during the U-ing of the blank and for conveying the chain from the link forming station. The U-ing operation as represented in Fig. 13, is the next following that of forming the eyes indicated in Fig. 12. The forward end portion of this conveyer is made separate and of hardened steel and comprises a U-ing tool 141 that operates in conjunction with the former post 93, see Fig. 13. This U-ing operation is formed by the U-ing tool 141 engaging the two end portions of the wire blank and bending them back against the two sides of the former post 93. This conveyer 139 is mounted on a slide 142 which carries a roll 143 that rides in a groove of a cam 144 mounted upon the cam shaft B.

The central slide 92 is mounted to reciprocate vertically in the slide bracket 89 and is engaged by a lever 112 pivotedly mounted in the bearing 113 of the bracket 89. The outer end of this lever carries a roll that engages a groove in the side of the before mentioned cam 173. This slide is provided with a hingedly attached tool carrying holder 145 that is hinged to the upper part of the said slide at 146, extends down along its front portion, and is provided with side flanges that engage the sides of the slide 92 in a way to support the holder against sidewise movement. The lower end of this holder is yieldably held against the lower end portion of the slide by means of a spring 147 positioned upon a screw 148, extending freely through the said holder and engaging the slide. One of the ends of this spring is supported against the head of the screw and the other against the holder so as to act against the latter and hold it against the slide 92. This holder is provided with a cross arm 149 which carries a shoe 150 on each end and whose lower ends are beveled to better engage and ride upon the lugs 151 so that the former post may freely descend, clear of the wire blank and then be brought forward during the further and final downward movement of the slide 92 and its holder 145, so that the front edge of the former post will set up tight against the side of the wire blank to prevent it from turning during the further forming operations.

This former post is supported upon the inner side and in the groove at the lower end of the tool holder, while the setting tool 94 is attached to the front side of the holder directly in front of said centrally positioned former post. These two tools are preferably secured to the holder by screw bolts 153 passing through said tools and holder to secure the same together. The former post is slightly longer than the setting tool and obviously performs a more important function, namely that of providing a form, around which the wire blank is bent, to form the loop of the link. The setting tools descend simultaneously with the post and enter the loop of the previously formed link in a way to engage the inner walls of the side of the loop portion to spread the same against the grooves of the U-ing tool, which in turn throws the two eye portions of the same link tightly together so as to make the link rigid, thereby eliminating any possibility of the stretch of chain after it is formed.

The former post having thus been positioned against the wire blank and the eye-end of the previously formed link, and in alignment with the center of the U-ing tool, the next operation would be that of said U-ing tool which is shoved forward, the round end portions of its two longitudinal grooves engaging the side of the two end portions of the wire blank in a way to bend and dispose the same in parallel alignment against the opposite sides of the former as shown in Fig. 13. This operation as will be noted brings the two eye portions of the blank in alignment with each other at the rear of the post, and back of the preliminary position of the blank, where the first operations thereon are performed.

After the U-ing operation the two eye portions of the blank are further operated upon by the first pair of side tools 154 and 155, one of which carries a pin 156 and the other of which is provided with a hole 157 to receive the end of said pin 156 when the two tools are moved inward. The purpose of the pin is obviously to enter and align the eyes of the link and to retain them in alignment during the further closing movements of the side tools, which movement further bends in the two opposite side portions of the blank serving to form the two shoulders, and brings the two eyes together to close the loop of the link as shown in Fig. 14. One of these side tools 154 is adjustably mounted upon a slide 158, carrying a roller upon its outer end that rides in a groove of a cam 159 upon the shaft D, while the other side tool 155 is similarly mounted upon a slide 160 that likewise bears a roll to engage a groove in a cam 161 mounted upon the before mentioned shaft A.

A second pair of side tools 162 and 163 are operatively positioned adjacent to the before mentioned side tools 154 and 155 and have their inner end portions properly shaped to simultaneously engage the end portions of the blank and dispose them in the position shown in Fig. 15, in under the shoulders of the link and the post, to partially curl said ends around the respective shoulders as indicated by full and dotted lines in Fig. 15. These side tools are moved back and forth simultaneously, one being adjustably attached to a slide 164 operatively connected with a groove of the cam 159 upon the shaft D, and the other is similarly mounted upon a slide 165 that is operatively connected in a cam groove 166 of the before mentioned cam wheel 161. These slides are oppositely mounted to reciprocate backward and forward in ways of the bed and are thus provided with a positive backward and forward horizontal movement so that the tools are brought up at the proper time and remain in position sufficiently long to perform their proper function.

Figure 5:
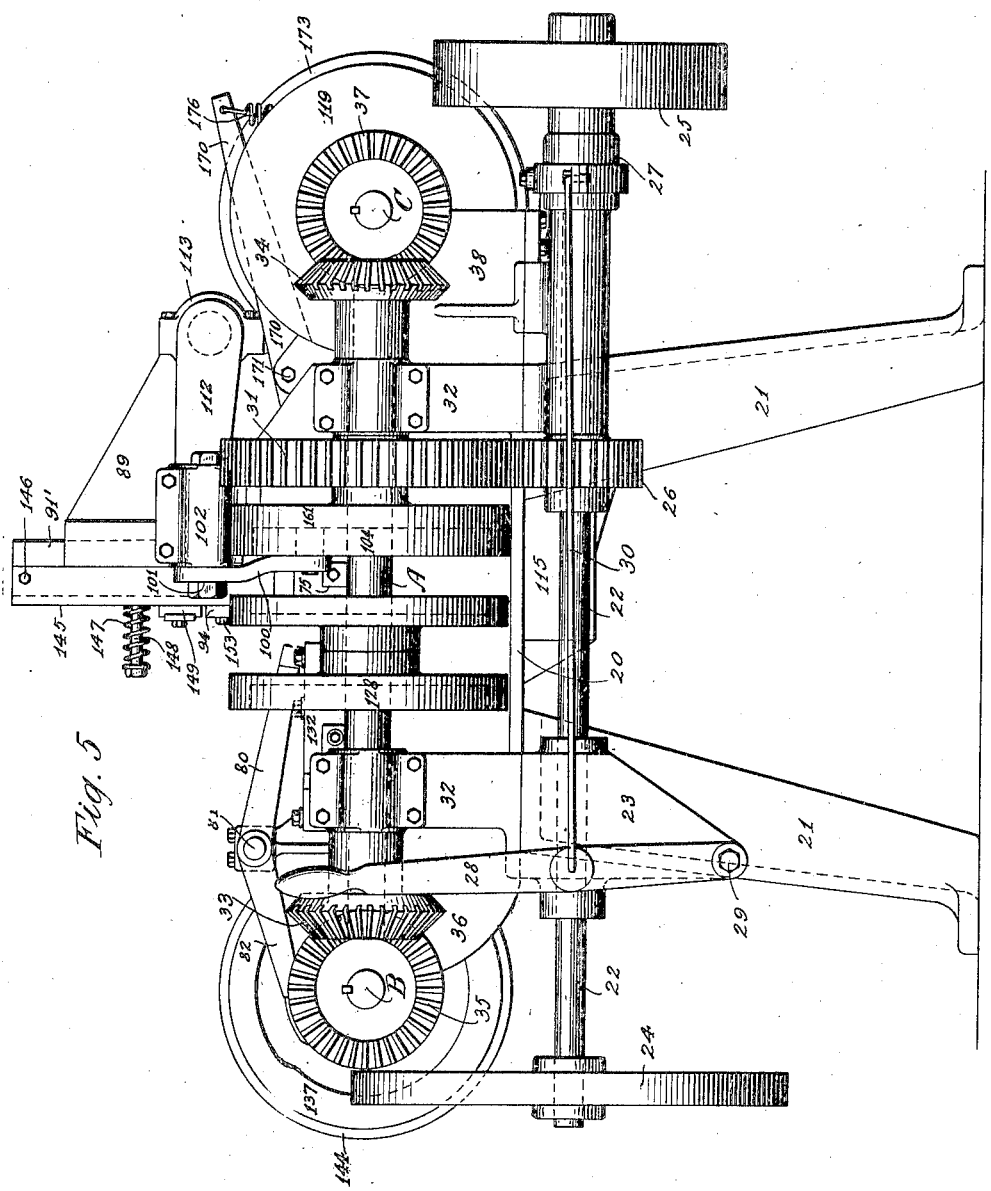
Fig. 5 shows an opposite side elevation from that shown in Fig. 4.
Figure 6:
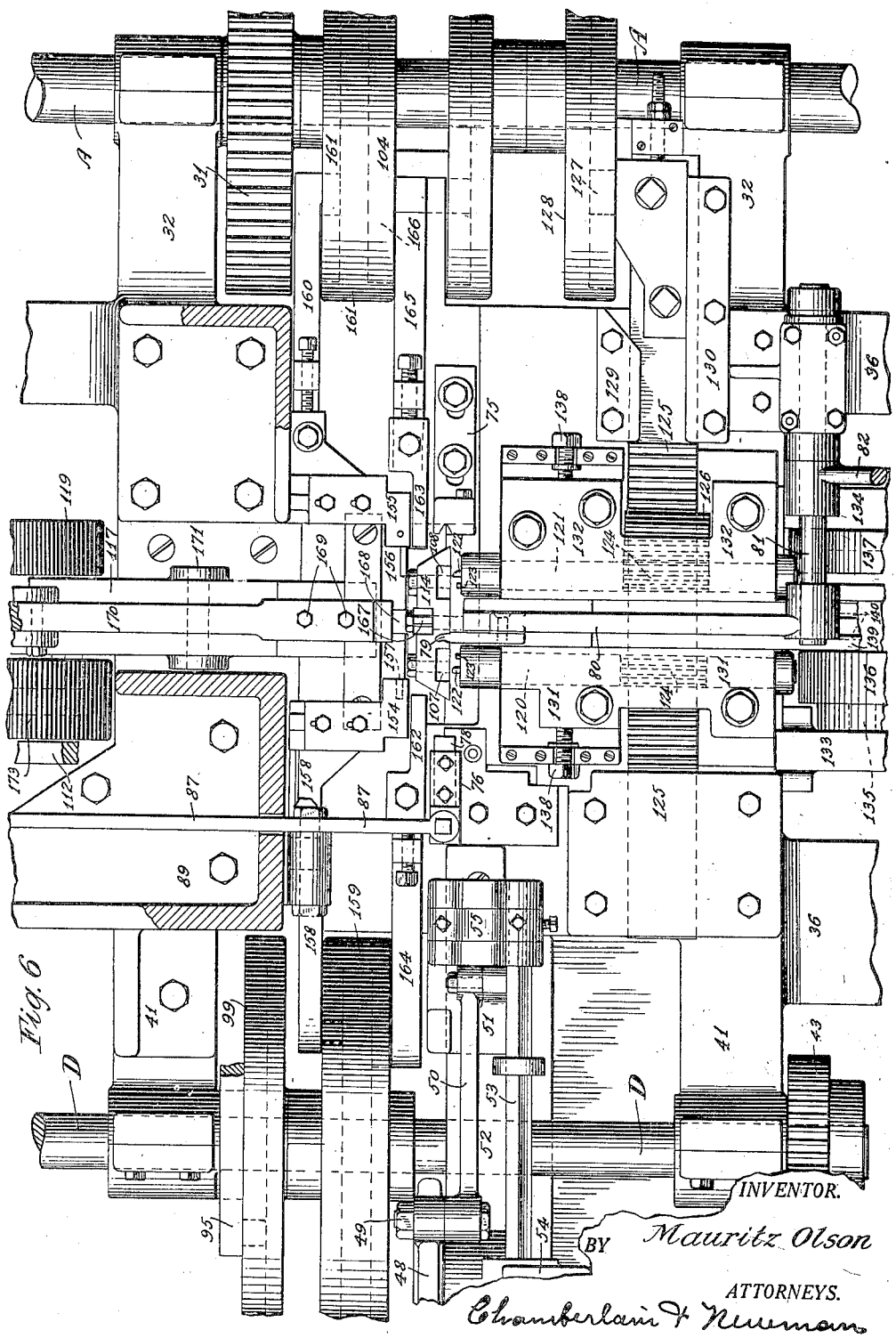
Fig. 6 is a further plan view, on an enlarged scale, of the central portion of the machine, as seen in Fig. 1.

Referring now to Fig. 16 it will be seen that I have shown a short piece of chain including an unfinished link, the portions of which are shown both in dotted and full lines. The dotted lines represent the position of these ends as shown in Fig. 5 and as left by the action of the second set of side tools 162 and 163 whereas the upwardly deflected positions of the ends of the link as shown in this Fig. 16 represents the further bending operation as performed by the lower tool 167 which is brought up at the proper instant and in close relation to the bottom end of the former post as the same is withdrawn. This bottom tool thus leaves the two end portions of the wire disposed vertically through the loop, close together, side by side and close against the respective shoulder portions of the link.

The link is obviously held during this further bending operation, by the two sets of side tools, the pin carried therewith and by the U-ing tool, in a way to prevent movement of the link except the free wire-end portions. This lower tool 167 is adjustably attached to and centrally of the before mentioned slide 114 which as before stated, is given two reciprocations to one of each of the other tool slides. The first reciprocation being to insure action of the preliminary forming tools 107 and 108 and the second movement for the action of the single central lower tool 167.

The final and important operation of the machine whereby the upwardly disposed wire-ends, as shown in full lines in Fig. 16, are bent forward completely over and down tight upon the shoulders of the link and against the peripheral surface of the eyes to form a smooth and perfect link, is performed by a hook-like tool 168 (see Figs. 9 and 17) that is adjustably secured by means of screws 169 to a lever 170. This lever is pivoted at 171 to a slide 172 operatively mounted in ways of the bed and designed to reciprocate toward and from the center of the machine by a cam roll mounted upon the slide and engaging a cam groove in a cam 173 mounted upon the before mentioned shaft C. The other end of the tool carrying lever 170 is also provided with a roll 174 which rides upon the face of a small cam 175 also mounted upon the said shaft C. The roll 174 of this lever 170 is held against the face of the cam 175 by means of a spring 176, one end of which is attached to said lever and the other end to a bracket 177 secured to the bed of the machine.

From the foregoing it will be seen that this hook shaped final-bending tool is mounted to operate over the central portion of the eye of the link and is provided with both vertical and horizontal reciprocatory movements that are so proportioned as to engage the said upwardly disposed end portions of the wire at the instant they are so disposed and to simultaneously bend them forward and press the ends down tightly so that no portion thereof will protrude beyond other surface portions of the link. After this operation is thus completed the tool moves back out of the way and the side tools separate leaving the loop portion of the link still in engagement with the U-ing tool so as to be supported thereby with its eye-end projected beyond the end of said tool.

The conveyer and U-ing tool are next moved outward by means of the before mentioned cam 144 which carries the chain including the last formed link outward a distance sufficient to insure the positioning of the eye of said last formed link in alignment with the wire to be fed so when the same is fed forward and passed through the movable guide 79 it will enter the said eye so as to thread and position the same upon and central of the length of the wire blank when cut off.

Briefly the several operations of forming the links, and as illustrated in Figs. 11 to 18, is as follows: The straight wire stock is fed forward a predetermined distance by the slide 52, being threaded through the eye of the previously formed link, which has been moved upon completion to such position as to receive it. The proper length of wire is cut off by the cutting tool 84, and simultaneously with the cutting off operation preliminary bends are imparted to the wire through the operation of the forming tools 105—106, 107—108, and 109—110 (Fig. 11).

The curling devices 120 and 121 (Fig. 12) now move forward to engage the wire, the center pins 122 engaging the upper side of the previously bent portions, while the eccentric pin 123 engages the lower side. The curling devices are now rotated in opposite directions, so that the ends of the wire are brought inward, downward, and at an angle to the immediate body portion of the wire, and eyes are formed at each end. The previously formed link of the chain is disposed in the grooves 140 of the U-ing tools 141, with its eye supporting the link being formed. Upon the next forward movement of the U-ing tools the ends of the link being formed are bent into U-form about the former post 93 (Fig. 13) which has been previously lowered into position. At the same time that the former post is engaged with the wire the setting tool 94 (Fig. 15) is engaged with the loop of the previously formed link in a manner to engage the inner walls thereof and spread the same against the grooves of the U-ing tools 141, which in turn throws the two eye portions of the link tightly together, so as to make the link rigid, thereby eliminating any possibility of the stretch of the chain after it is formed.

The U-ing operation brings the eyes of the wire into alignment. Side tools 154 and 155 (Fig. 14) are operated to bring the eye portions together, the pin 156 on the tool 155 engaging the eyes. The former post 93 cooperates during this operation to form shoulders at the end of the loop. A second pair of side tools 162 and 163 (Fig. 15) are next operated to bend the ends of the wire downwardly and beneath the shouldered end of the loop.

The ends of the wire are now bent upwardly into the loop by the upward movement of the tool 67 (Fig. 16) and are finally bent forwardly over the shouldered end of the loop and so that the extremities engage the surface of the eyes by means of the vertically and horizontally reciprocating hook-shaped tool 168 (Fig. 17). The last formed link is now moved outwardly by the conveyor means, so that its eye is in position to receive the wire for forming the next link. This is the position indicated by the second link from the end in Fig. 9, the last formed link being moved to this position.

Having thus fully described my invention, what I claim and desire to secure by Letters Patent is:—

1. In a machine for automatically making wire chain, the links of which comprise a relatively large loop portion at one end and an eye at the other end, the combination of a bed, a series of tool carrying slides operatively mounted in the bed and adapted to operate from four directions to and from the center of the bed, where the links are formed, forming tools mounted above and below the bed in alignment with and adapted to operate toward and from each other, a lever member pivotally mounted upon one of the slides of the bed, carrying a bending tool upon its inner end, means for reciprocating the said slide together with its lever and means for operating the lever when in its forward position to cause the tool to engage the upwardly disposed free end portions of the wire link and bend them down close against the eye with the return movement of the slide carrying said lever.

2. In a machine for automatically making wire chain, the links of which comprise a relatively large loop portion at one end and a smaller eye at the other end, means for forming the preliminary bending operations in the two end portions of the wire blank, U-ing tools for folding the link, side tools for aligning and closing the eyes together and to form shoulders in the loop, means for disposing the adjacent downwardly deflected end portions of the wire blank up together through the loop and against the respective shoulder, and means for simultaneously engaging the two said upwardly disposed end portions of the wire and bending them over and down upon the said shoulder portions of the link and their ends against the peripheral portion of the eye to form a smooth link.

3. In a machine for automatically making wire chain, the links of which comprise a relatively large loop portion at one end and smaller eyes at the other end, the combination of means for forming preliminary bending operation in the two end portions of a wire blank, U-ing tools for folding the link, side tools for aligning and closing the eye end portions together and to form shoulders in the loop, means for disposing the adjacent downwardly deflected end portions of the wire blank up together through the loop against the respective shoulders, a reciprocatory slide and means for operating the same, a lever pivotally mounted upon the slide having a hook-like tool upon its forward end, means for operating the slide and lever to cause the tool of the latter to engage the two end portions of the wire blank and bend them down around the shoulder and their end positioned against the eyes of the link.

4. In a machine for automatically making wire chain links, which comprise a relatively large loop portion and an eye portion, the combination of means for forming preliminary bending operations on the two end portions of a wire blank, a vertical reciprocatory slide operatively mounted above said preliminary bending means, a former post carried by the slide, a U-ing tool for folding the link around the former post, side tools for aligning and closing the two eye portions of the link together, means for further bending the end portions of the wire blank to complete the link, and a setting tool also carried by the slide for the former post whereby both the former post and setting tool are simultaneously operated for the final setting of one link simultaneous with the folding operation of the new link.

5. In a machine for automatically making a wire chain, the links of which comprise a relatively large loop portion at one end and a smaller eye at the other end, the combination of mechanism for feeding wire forward through the eye of the previously formed link; means for cutting off blanks of wire and forming preliminary bends in the two end portions of said blank, means for simultaneously curling the two said bent end portions of the blank to form eyes, means for folding the wire blank to bring the eye portions together, a setting tool, and means for moving the setting tool into the loop of the previously formed link, whereby the loop is set in a way to throw the eye portions close together to prevent stretching of the chain.

6. In a wire forming machine, the combination with wire blank holding means, a pair of rotatable curlers adapted to simultaneously form eyes of the end portions of the blank, a former post adapted to be positioned against the center of the wire blank, a reciprocating chain conveyer having opposite longitudinal grooves for guiding the movement of a chain therethrough, a U-ing tool secured to the forward end of said reciprocating conveyor and having grooves aligned with those in the sides of the conveyer, said tool adapted to engage and fold the wire around the former post, means for bending the two end portions of the wire around the shoulders of the loop and disposing said ends against the eyes of the link.

7. In a wire chain machine, the combination with preliminary bending tools, a pair of curlers for curling the end portions of the wire blank, a U-ing tool for folding the said blank, a vertical reciprocating slide positioned above the line of operation of the U-ing tool, a tool holder pivotally connected to the said slide and adapted to be normally but yieldably held in relation thereto, a forming tool carried by the said tool holder adapted to operate in connection with the U-ing tool in the folding of the wire link blank, means for imparting forward movement to the tool holder and tool post carried thereby during its downward movement for positioning the former post against the back of the wire blank preparatory to the U-ing operation.

8. In a wire chain machine, the combination with preliminary bending tools, curling devices for forming eyes in the end portions of the wire blank, means for folding the blank including a reciprocatory slide, a tool holder pivotedly connected thereto, a spring to be normally held in the holder in relation to the slide, fixed means for engagement with the holder during the extreme lower portion of its downward movement, a post carried by the holder adapted by reason of the foregoing construction of holder to be lowered back of the wire blank and then to be moved forward in close engagement therewith to clamp the same during the further bending operation.

9. In a chain machine, the combination of a bed including a central link forming station, means for feeding wire forward and across the said forming station, a wire cutting means, a pair of lower wire gripping tools to engage the wire blank on the two sides of its middle portion, a pair of rotary curlers each including a centering pin and an eccentrically positioned wire engaging means, separate slides upon which each of the curlers are operated, like means for similarly reciprocating the slides and curlers to engage and disengage the wire blank, a rack and connections for rotating the curlers to curl the end portions of the wire blank, a vertically movable centrally aligned former post, a reciprocatory U-ing tool adapted to operate in conjunction with the former post in a way to bend the wire around the latter to form the loop end of the link, means for closing the eyes of the link together, means for completing the curling of the wire to form the eye, a setting tool positioned in advance of the former post to engage the loop portion of the previously formed link in a way to set the two eye portions of the link tight against each other.

10. In a chain machine, the combination of a bed having a central link forming station, means for feeding the wire blanks forward and across the said forming station, a pair of wire gripping tools, a pair of rotary curlers each including a centering pin and an eccentrically positioned wire engaging means, separate slides upon which each of the curlers are operated, like means for similarly reciprocating the slides and curlers to engage and disengage the wire blank, a single rack for rotating the curlers, a vertically movable former post, a reciprocatory U-ing tool positioned between the curlers adapted to operate in conjunction with the former post in bending the wire, means for closing the eyes of the link together, a setting tool positioned in advance of the former post to engage the loop portion of the previously formed link while positioned in the U-ing tool in a way to spread the loop and thereby set the two eye portions of the link tight against each other.

11. In a wire feeding device, the combination with a feed slide, operation connections with an operating shaft, of a wire clamping means carried by the slide and also operated by the operating shaft, and detachable means for disengaging said operating connection of the wire clamping device and the operating shaft with a predetermined number of operations of the said operating shaft.

12. In an automatic wire chain machine, the combination with link forming tools, of wire feeding and cutting mechanism for producing link blanks, means for operating said feeding device a predetermined number of times and then skipping a feeding operation to produce pieces of chain including a specified number of links, and means for changing the feeding and skipping mechanism so that the lengths of chain may include a greater or less number of links.

13. In a wire chain machine, the combination with an operating shaft, of a feed slide, connections between the shaft and the slide for reciprocating the latter, a secondary shaft driven from the operated shaft and in increased relation thereto, a clamping mechanism carried by the slide, means for operating the clamping mechanism with each reciprocation of the slide, mechanism for disengaging the clamping operating mechanism with a given number of rotations of the operating shaft whereby a limited number of feeding operations are effected.

14. In a wire feeding device, the combination with a feed slide, operating connections with an operating shaft, of a wire clamping means carried by the slide and operated by the operating shaft, detachable means for disengaging said operating connection of the wire clamping device and the operating shaft, with a predetermined number of operations of the said operating shaft, manual operating means for also effecting said disengagement of the wire clamping means whereby the feeding operation of the wire may be discontinued at the will of the operator.

15. In a wire feeding device, the combination of a feed slide, connections, and an operating shaft, of a wire clamping means carried by the slide and also operated by the operating shaft, detachable means for disengaging said operating connection with the wire clamping device and the operating shaft with a predetermined number of operations of the said operating shaft, comprising in part a cam actuated slide and rack, a shaft and pinion connected therewith, detachable means for connecting the slide and rack, a device intermediate of said detachable means and the operating shaft whereby the detachable means is disconnected within any predetermined number of rotations of the operating shafts.

16. In a wire feeding device, the combination with a feed slide clamping device carried thereon, means for reciprocating the slide, means for operating the clamping device with each reciprocation of the slide, a driving and driven shaft, the former for operating both the slide and clamping device and the latter for disconnecting the operating connection of the clamping device, a changeable driving connection between the two said shafts whereby the driven shaft makes a single rotation to a specific number of rotations of the driving shaft and whereby with each complete rotation of said driven shaft the clamping device is disconnected in a way to skip a single feed.

17. In an automatic wire chain machine, the combination with link forming tools, of wire feeding and cutting mechanism for producing link blanks, means for operating said feeding device a predetermined number of times and then skipping a feeding operation to produce pieces of chain of a specified number of links, comprising a feed slide, a shaft and connections for reciprocating the slide, a wire clamping means carried by the slide, a secondary shaft through which the clamping device is operated, connections intermediate of the driving shaft and the secondary shaft whereby the former is permitted to rotate a limited number of times with a complete rotation of the secondary shaft, and means intermediate of the secondary shaft and the wire gripping device whereby with each complete rotation of the secondary shaft the gripping device is thrown out of operation.

Signed at Bridgeport, in the county of Fairfield and State of Connecticut, this 18th day of March, A. D. 1922.

MAURITZ OLSON.

Witnesses:
- LILLIAN M. ALLING,
C. M. NEWMAN.